United States Patent [19]

Labedz et al.

[11] Patent Number: 4,847,869
[45] Date of Patent: Jul. 11, 1989

[54] RAPID REFERENCE ACQUISITION AND PHASE ERROR COMPENSATION FOR RADIO TRANSMISSION OF DATA

[75] Inventors: Gerald P. Labedz, Chicago; David E. Borth, Palatine, both of Ill.

[73] Assignee: Motorla, Inc., Schaumburg, Ill.

[21] Appl. No.: 128,975

[22] Filed: Dec. 4, 1987

[51] Int. Cl.$^4$ .................... H03D 3/00; H04L 27/14

[52] U.S. Cl. .................... 375/85; 375/102; 375/114

[58] Field of Search ............... 375/83, 85, 86, 96, 375/97, 120, 13, 99, 101, 102, 114; 329/50, 112, 122, 124; 370/100

[56] References Cited

U.S. PATENT DOCUMENTS

| | | | |
|---|---|---|---|
| 4,122,393 | 10/1978 | Gordy et al. | 375/96 |
| 4,414,675 | 11/1983 | Comroe | 375/90 |
| 4,475,218 | 10/1984 | Takeda et al. | 375/81 |
| 4,498,050 | 2/1985 | Yoshida | 329/110 |
| 4,587,662 | 5/1986 | Langewellpott | 375/1 |
| 4,592,075 | 5/1986 | Tsukamoto | 375/83 |
| 4,599,732 | 7/1986 | Le Fever | 375/115 |
| 4,606,051 | 8/1986 | Crabtree et al. | 375/86 |
| 4,614,910 | 9/1986 | Ishigaki et al. | 375/83 |
| 4,628,517 | 12/1986 | Schwarz et al. | 375/40 |
| 4,631,486 | 12/1986 | Snell | 375/83 |
| 4,669,091 | 5/1987 | Nossen | 375/14 |
| 4,669,092 | 5/1987 | Sari et al. | 375/106 |
| 4,672,447 | 6/1987 | Moring et al. | 358/148 |
| 4,672,638 | 6/1987 | Taguchi et al. | 375/99 |
| 4,704,582 | 11/1987 | Dixon et al. | 375/83 |

FOREIGN PATENT DOCUMENTS 0174125 3/1986 European Pat. Off. .
0184018 6/1986 European Pat. Off. .

OTHER PUBLICATIONS

Price et al.; "A Communication Technique for Multipath Channels", Proceedings of the IRE; vol. 46, Mar. 1958; pp. 555–570.
Turin; "Introduction to Spread-Spectrum Antimultipath Techniques and Their Application of Urban Digital Radio", Proceedings of the IEEE; vol. 68, No. 3, Mar. 1980; pp. 328–353.
Eckert et al.; "The Fully Digital Cellular Radiotelephone System CD900"; Nordic Seminar on Digital Land Mobile Radiocommunication; Feb. 5–7, 1985, Espoo, Finland; pp. 249–259.
Inmos; "Cascadable Signal Processor TMS A100"; Catalog Sheet, Jul. 1986.
Stjernvall et al.; "Radio Test Performance of a Narrowband TDMA System"; 37th IEEE VTG Conference; Jun. 1–3, 1987; pp. 293–299.
Stjernvall et al.; "Radio Test Performance of a Narrowband TDMA System-DMS 90"; International Conference on Digital Land Mobile Radio Communications; Venice; Jun. 30–Jul. 3, 1987; pp. 310–317.
Langewellpott et al.; "Performance Analysis of Radio Transmission in the Fully Digital Cellular Radio System CD900"; Nordic Seminar on Digital Land Mobile Radiocommunications; Feb. 5–7, 1985, Espoo, Finland; pp. 261–269.
Leuenberger; "Digital Radio Systems Examined–Part I, General State of the Art"; MSN & CT; vol. 16, No. 1; Jan. 1986; pp. 81–92.
Raith et al.; "Multi-Path Equalization for Digital Cellular Radio Operating at 300 KBit/S"; 36th IEEE VTG Conference, Jun. 1986; pp. 268–272.
Kammeyer; "Equalization Problems in a Digital FM Receiver"; Signal Processing, vol. 9, No. 4; Dec. 1985; pp. 263–276.
Franks, "Carrier and Bit Synchronization in Data Communication–A Tutorial Review", IEEE Trans. Comm., vol. COM-28, Aug. 1980, pp. 1107–1121.

Primary Examiner—Robert L. Griffin
Assistant Examiner—Stephen Chin
Attorney, Agent, or Firm—Raymond A. Jenski; Rolland R. Hackbart

[57] ABSTRACT

The method and apparatus for rapid phase acquisition and random radio channel phase error compensation for a TDMA QPSK receiver is disclosed. Received quadrature signals having a known synchronizing sequence transmitted on one of the vectors is correlated to a local replica of the sequence. The output correlation detection signals are held for the duration of the TDMA timeslot and multiplied by the received quadrature signals to produce two pairs of products. The mutually exclusive product pairs are summed to recover data having the random phase error compensated.

16 Claims, 7 Drawing Sheets

RAPID REFERENCE ACQUISITION AND PHASE ERROR COMPENSATION FOR RADIO TRANSMISSION OF DATA

BACKGROUND OF THE INVENTION

This invention relates generally to multi-phase data transmission and more particularly to Time Division Multiple Access (TDMA) radio systems employing multiphase modulation in which rapid phase acquisition is important. This invention is related to U.S. applications Ser. Nos. 128,926 "Phase-Coherent TDMA Quadrature Receiver for Multipath Fading Channels" and 128,677 "TDMA Radio System Employing BPSK Synchronization for QPSK Signals Subject to Random Phase Variation and Multipath Fading", each filed on behalf of David E. Borth et al., filed on the same date as the present invention, and containing related subject matter.

In a Time Division Multiple Access (TDMA) radio system, or any communications system generally where fast acquisition and a high data rate are important considerations, a receiver is required to receive short bursts of data from one or more transmitters, each in its own timeslot. For each timeslot, a receiver using a coherent demodulator must rapidly acquire a phase reference in order to properly decode the data transmitted in that timeslot. Typically, each transmitter sends an acquisition sequence (preamble) preceding the timeslot data for this purpose. When coherent detection techniques are employed, the receiver typically regenerates the transmitted carrier phase from a carrier regeneration circuit of some type.

One common multiple-phase data modulation technique is Quadrature Phase Shift Keying (QPSK) in which half of the data to be transmitted is modulated on a carrier having 0° (and 180°) phase ( the I channel) and half is transmitted on a quadrature carrier (the Q channel) at 90° (and 270°). This signal may be transmitted over a radio channel having a random and highly variable shift in the phase. Upon reception, a reference must be established in order that the I and Q channels be identified so that the data can be properly recovered. Previous techniques in resolving the I and Q channel phases have utilized acquisition sequences that generally were different or independent in the I and Q channels. It is also known that the phase of the receiver local oscillator may be varied in order to correct for the phase offset introduced by the radio channel path. However, when high speed TDMA communications over a variable radio channel is contemplated, a more rapid acquisition method is desirable.

SUMMARY OF THE INVENTION

Therefore, it is one object of the present invention to present a synchronizing method and apparatus which offers rapid phase acquisition.

It is a further object of the present invention to transmit the synchronizing preamble in only one of the quadrature modulation channels.

It is a further object of the present invention to resolve the I and Q channels without the necessity of instantaneous correction of the local reference oscillator phase.

Accordingly, these and other objects are achieved in the present invention which encompasses a digital radio receiver which demodulates a time division quadrature signal. The receiver utilizes an oscillator generated reference signal to separate the quadrature modulated data signal into first and second intermediate signals. A predetermined synchronizing signal is detected by the receiver and employed in the calculation and removal of the phase difference between the reference signal and the first and second intermediate signals.

DESCRIPTION OF THE PREFERRED EMBODIMENT

Figure 1:
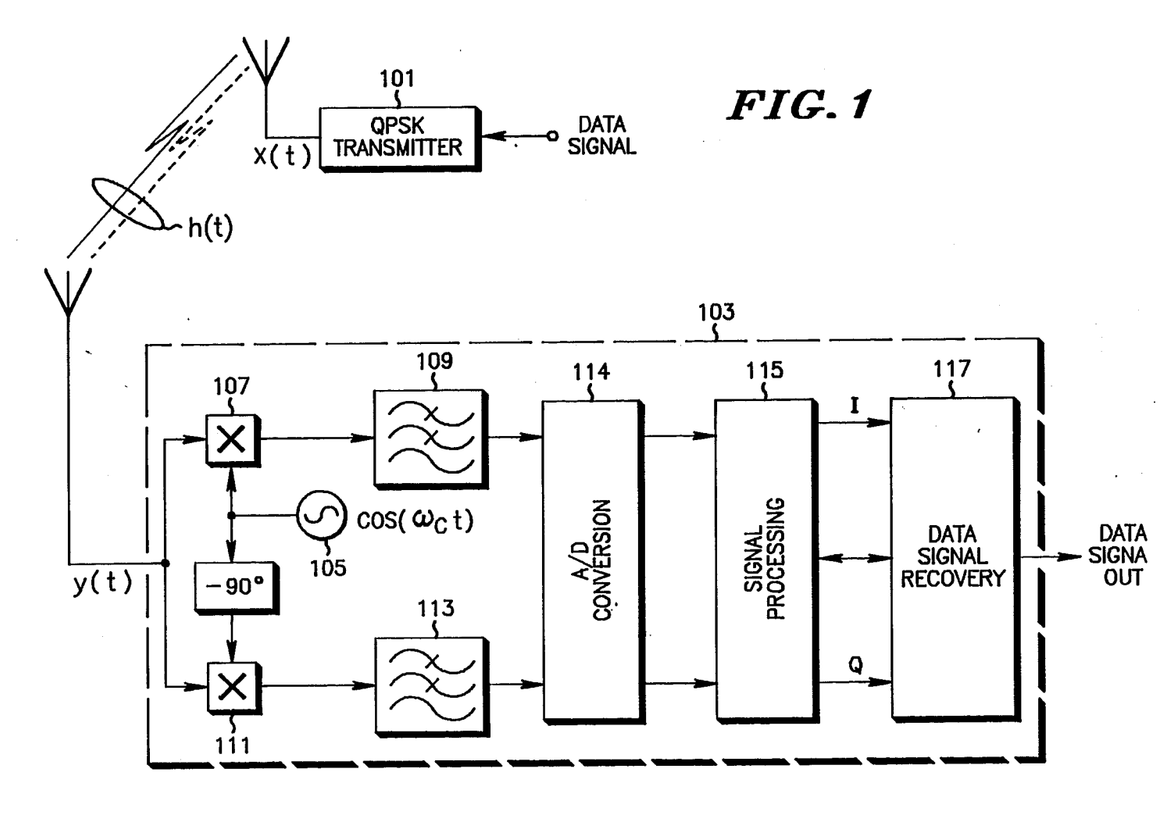
FIG. 1 is a block diagram of a data transmission system employing quadrature digital transmission and reception.

A radio frequency system conveying a data signal from a transmitter 101 to a receiver 103 is shown in FIG. 1. In the preferred embodiment, quadrature phase shift keying (QPSK) is employed to increase the throughput of the channel, although other multi-dimensional signaling may equivalently be employed. Further, the well-known time division multiple access (TDMA) technique of sharing a limited channel resource among a large number of users is employed in the present invention. Each of the users is assigned a brief period of time (a timeslot) during which a message may be transmitted to or received from the user. The advantages of such a TDMA technique over other techniques (such as frequency division multiple access TDMA) are: (a) no duplexer is required for full duplex communications, (b) variable data rate transmission may be accommodated through the use of multiple adjacent time slots, (c) a common radio frequency power amplifier may be used to amplify multiple channels at any power level without the combining losses or intermodulation distortion present with FDMA, and (d) a capability of scanning other "channels" (timeslots) without requiring separate receivers may be provided.

The present invention may be utilized in a digital radio system employing TDMA message transmission at a relatively high data rate (200 Kbps to 2 Mbps) or, more generally, when the rate of change of the channel characteristics are slower than the timeslot duration. The radio channel (denoted by h(t)) for urban, suburban and rural environments is subject to a propagation delay proportional to the distance the receiver 103 is from transmitter 101. An additional random and variable propagation delay is introduced into the channel h(t) by reflections of the radio signal. The total delay is exhibited as a phase error between the transmitted signal x(t) and the received signal y(t).

The present invention is directed at resolving the phase error and compensating this error at the data detector during a time slot. This is accomplished by transmitting an acquisition synchronization sequence during the timeslot (preferably at the commencement of the timeslot) as a binary phase shift keying signal (BPSK) with a predetermined phase relative to the QPSK data in the time slot. In the preferred embodiment, the acquisition synchronization sequence is transmitted only on the I vector of the quadrature modulated channel. Transmission on the Q vector of the quadrature modulated channel would be equally effective.

Figure 2A:
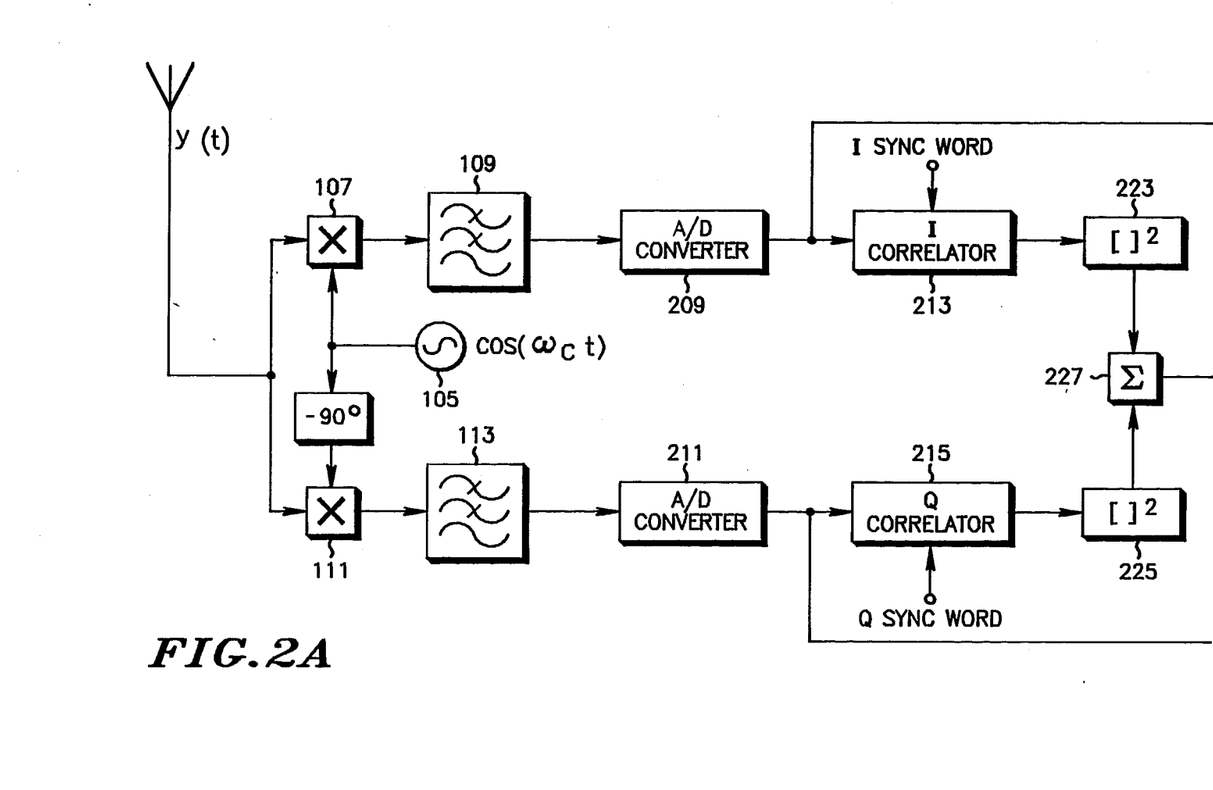
FIGS. 2A and 2B are, together, a block diagram of a TDMA receiver which may receive QSPK signals.
Figure 2B:
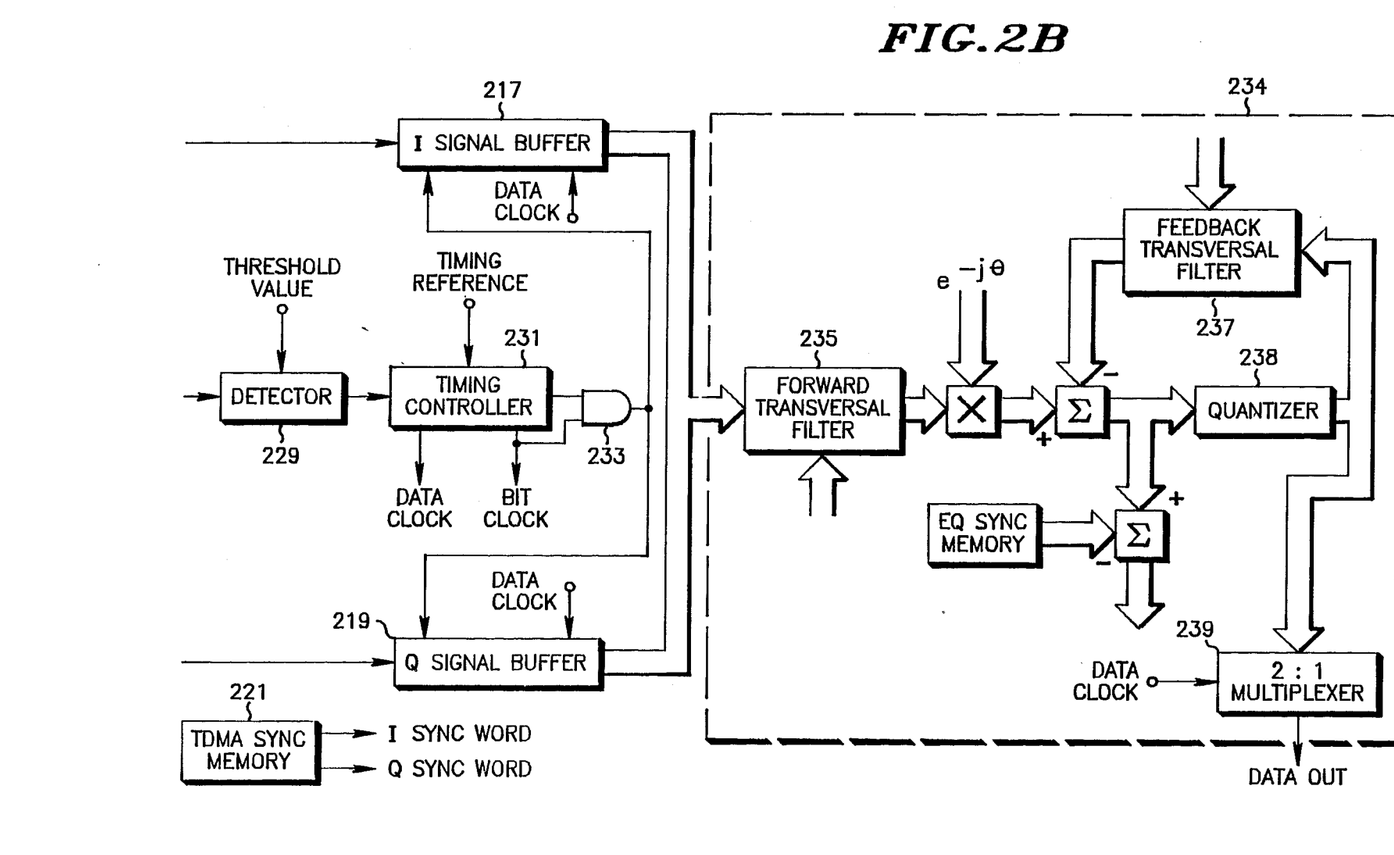

FIGS. 2A and 2B are a block diagram of a TDMA receiver which may be employed to receive QPSK signals and which may recover TDMA quadrature phase shift keying data. This receiver is further described in instant assignee's U.S. patent application Ser. No. 009,973 "TDMA Communications System with Adaptive Equalization", filed on Feb. 2, 1987 on behalf of David E. Borth and incorporated herein by reference. Here, the digital signal outputs of the A/D converters 209 and 211, respectively, are applied to in-phase (I) time slot correlator 213 and quadrature (Q) correlator 215, respectively, as well as to their respective signal buffers 217 and 219. I correlator 213 performs a correlation function between all received bits of the input signal and a pre-loaded synchronization word (I sync word) corresponding to the in-phase timeslot sync word.

The output of I correlator 213 is a digital bit stream representing the sample-by-sample correlation of the received data with the stored synchronization word replica for the timeslot. The correlation function exhibits a peak when the I sync word is located in the received sample data. In the same way, Q correlator 215 performs a correlation function between the pre-stored quadrature Q sync word from memory 221 and the sampled quadrature (Q) input.

The outputs of correlators 213 and 215 are applied to squaring clocks 223 and 225, respectively. The squaring block output signals represent the squared values of the separate I and Q correlation operations respectively. These squaring block outputs are then applied to summing block 227. The I and Q correlation signals are summed together to form a squared envelope signal which represents the sum of squares of the correlation signal. The squared envelope of the correlation signal makes an explicit determination of the phase ambiguity unnecessary. Thus, without resolving any ambiguity, a large amplitude signal output from summing block 227 represents a possible start location for a particular timeslot.

The output of summing block 227 is then routed to time slot detector 229, wherein the summed correlation signal is compared with a predetermined threshold value. This threshold value represents the minimum allowable correlation value which would represent a detected time slot. If the summed output is greater than the threshold value, a timeslot detect signal is generated and applied to system timing controller 231.

Timing controller 231 functions as a phase-locked loop (PLL), using stable timing reference to validate the time slot detect signal and provide a validated detect output signal. The validated timeslot detect signal is applied to AND gate 233 along with a bit clock output. The combined timeslot detect/bit clock signal is then routed to the I and Q signal buffers 217 and 219, respectively, and data signals are clocked into signal buffers 217 and 219 using the combined detect/bit clock signal.

In the implementation shown in FIGS. 2A and 2B a conventional baseband synchronous decision feedback equalizer (DFE) 234 is employed for data signal recovery. The DFE 234 basically consists of two parts: a forward linear transversal filter 235 and a feed back linear transversal filter 237. The forward filter 235 attempts to minimize the mean-square-error (MSE) due to intersymbol interference (ISI), while the feedback filter 237 attempts to remove the ISI due to previously detected symbols.

The decision feedback equalizer 234 structure is adapted at least once each time slot during receipt of the equalizer sychronization word in order to compensate for the effects of the time-varying multipath profile. Adaptation consists of minimizing the MSE differences between the received synchronization word which is stored in the receiver. The equalized and quantized complex data output from quantizer 238 is applied to multiplexer 239 for 2:1 multiplexing together with the data clock and output as an output data word.

Returning to FIG. 1, in a QPSK communication system, a transmitted signal x(t) may be expressed as:

$$x(t) = a(t) \cos \omega_c t + b(t) \sin \omega_c t \qquad (1)$$

where a(t) and b(t) are the in-phase and quadrature information signals and $\omega_c$ is the carrier frequency of the QPSK signal in radians/sec.

The signal which is input to receiver 103 is subject to the channel impulse response and is given by:

$$y(t) = x(t)*h(t).$$

The received QPSK transmission, y(t), has a phase offset, $\gamma$, with respect to the local oscillator 105 reference frequency of $\cos(\omega_c t)$. With the data rate employed in the preferred embodiment, the phase offset, $\gamma$, is essentially constant during a TDMA timeslot. (Although the antenna is shown connected to the mixers 107 and 111, it is likely that additional signal processing will be required for higher frequency radio signals. If down-conversion to an intermediate frequency is used, the output frequency of local oscillator may be different).

Thus, $$y(t) = a(t) \cos(\omega_w(t) + \gamma) + b(t) \sin(\omega_c(t) + \gamma). \qquad (2)$$

The outputs of mixers 107 and 111 are fed to low pass filters 109 and 113, respectively which, in turn, apply the filtered signals to a fast A/D conversion circuit 114. The digital representation of the intermediate analog signals is subsequently applied to signal processing 115 and data signal recover 117.

Figure 3:
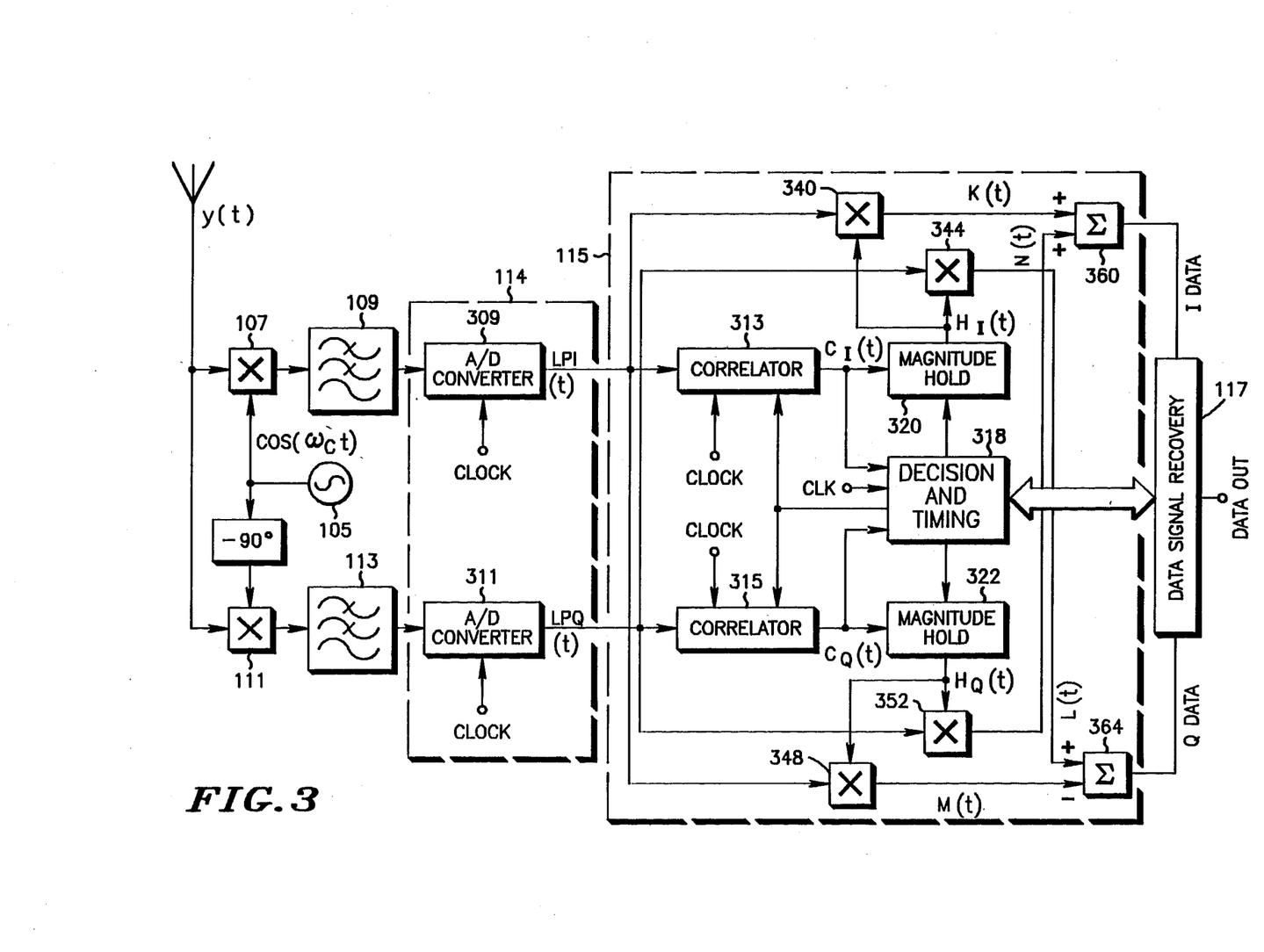
FIG. 3 is a block diagram of a TDMA receiver which advantageously employs the present invention to compensate radio channel induced phase error.

Referring now to the preferred embodiment of the invention as shown in the block diagram of FIG. 3, the A/D converter 114 is realized by two conventional four-bit A/D converters 309 and 311. These A/D converters operate at a rate of four samples per bit interval, each producing a sequence of numbers representative of the waveforms of the filtered quadrature uncompensated data signals.

At the output of A/D converter 309 the output number sequence LPI (t) at the sampled rate may be simplified and represented by:

$$LPI(t) = (\tfrac{1}{2})a(t) \cos \gamma + (\tfrac{1}{2})b(t) \sin \gamma \qquad (3)$$

and at the output of A/D converter 311 the output number sequence LPQ(t) may be represented by equation:

$$LPQ(t) = -(\tfrac{1}{2})a(t)\sin\gamma + (\tfrac{1}{2})b(t)\cos\gamma. \qquad (4)$$

In the preferred implementation of the invention, the acquisition synchronization sequence $a_T(t)$ for each timeslot is a known series of data bits, selected as having good aperiodic autocorrelation properties, such as or one of the Barker sequences. The transmitter 101 of FIG. 1, at the beginning of the timeslot for this receiver transmits:

$$x'(t) = a_T(t)\cos\omega_c(t). \qquad (5)$$

Thus, in one implementation of the invention, aT(t) is transmitted on a single phase, or vector, of the quadrature signal (b(t) is absent). The received and processed number sequence LPI'(t) therefore equals that of equation (6) and LPQ'(t) equals that of equation (7).

Thus, it can be seen that the unknown phase shift, $\gamma$, is available to the receiver after reception of the synchronization sequence. The problem to be solved, then, is the extraction and compensation of $\gamma$.

$$LPI'(t) = (\tfrac{1}{2})a_T(t)\cos\gamma \qquad (6)$$

$$LPQ'(t) = -(\tfrac{1}{2})a_T(t)\sin\gamma \qquad (7)$$

Figure 4:
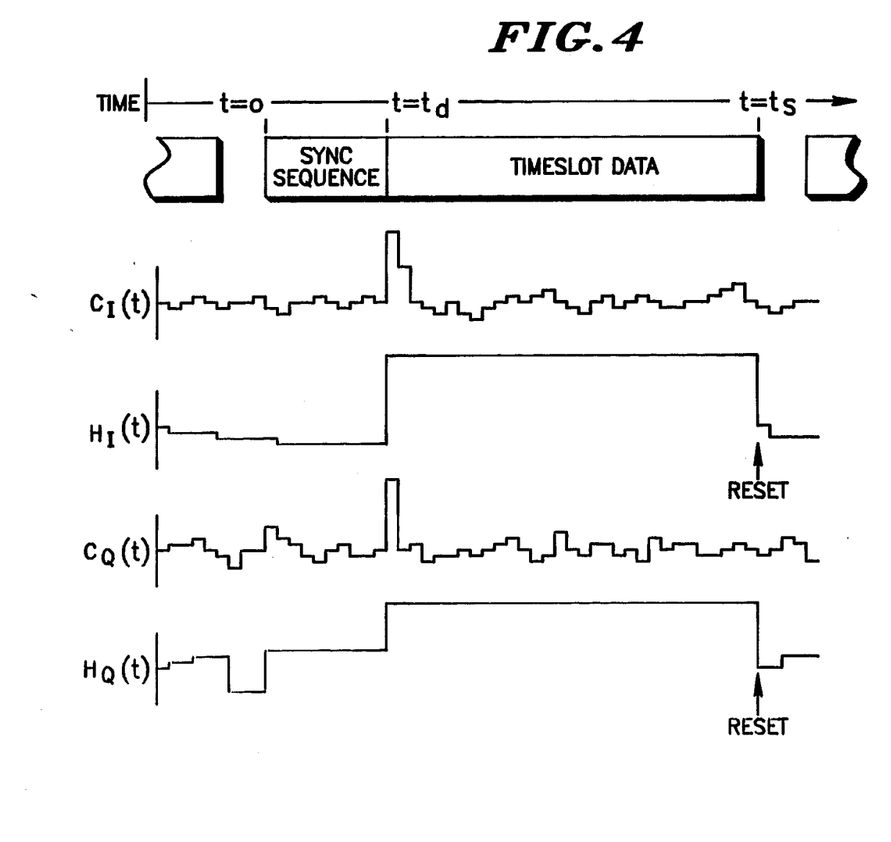
FIG. 4 is a timing diagram illustrating the relationship of correlation detection and correcting signals in the receiver of FIG. 3.

In the receiver of FIG. 3, the two correlators 313 and 15 may each be programmable digital output correlators such as IMS A100 Cascadable Signal Processors available from Inmos Corp., Colorado Springs, Colo. It is desirable, however, to implement the correlation function along with decision and timing, magnitude hold, and algebraic operations in a custom digital signal processor performing signal processing function 115. In the present TDMA receiver receiving a particular timeslot, and prior to the timeslot, decision and timing function 318 initializes the correlators 313 and 315 with a normalized local replica of the timeslot's acquisition sequence $a_T(t)$. (Other means of inputting $a_T(t)$, including hard-wire techniques, may also be employed without limiting the scope of the present invention.) Each correlator correlates its respective input number sequence against the local replica, producing a running string of signed digital correlation values which emerge at the same rate as the A/D sampling rate. The outputs of the correlators, $C_I(t)$ and $C_Q(t)$, generated during reception of the acquisition sequence, may have the appearance as shown in FIG. 4. (The timing diagram of FIG. 4 illustrates the relationship of correlator 313 output $C_I(t)$, correlator 315 output $C_Q(t)$, magnitude hold 320 output $H_I(t)$, magnitude hold 322 output $H_Q(t)$, and one timeslot of TDMA message). These outputs of the correlators 313 and 315 feed magnitude hold functions 320 and 322, and decision and timing function 318 which controls the peak magnitude holding operations in 320 and 322.

Figure 5A:
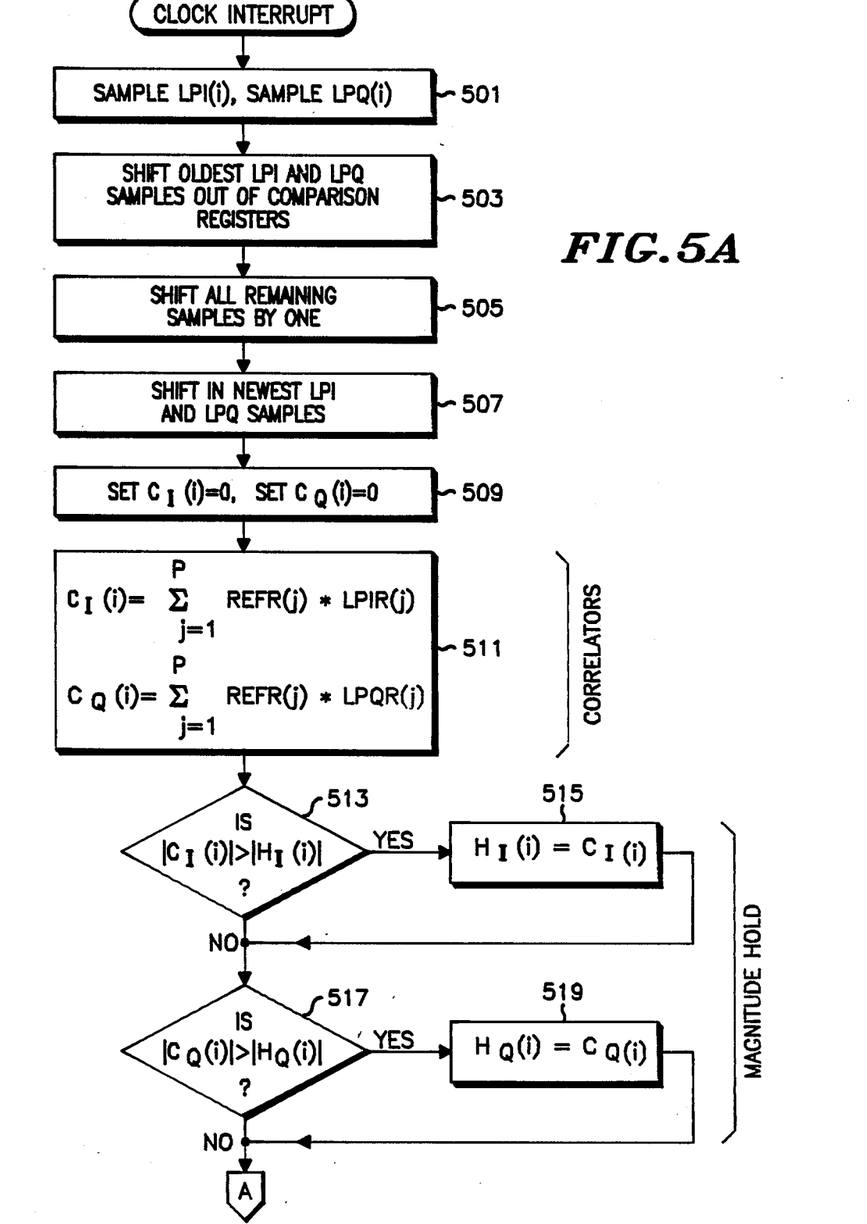
FIGS. 5A and 5B are a flowchart of the process which is used in the preferred embodiment to realize the correlation, magnitude hold, decision and timing, and algebraic functions of the receiver of FIG. 3.
Figure 5B:
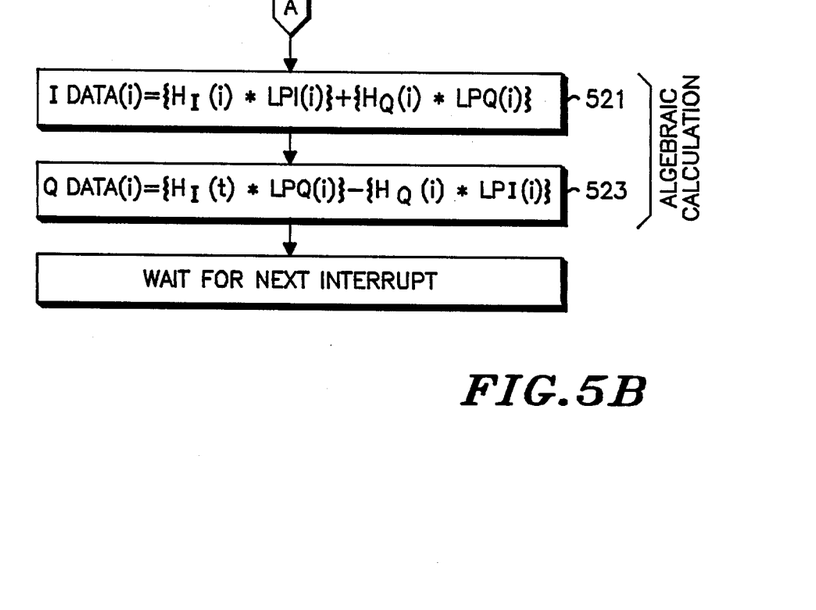

The magnitude hold functions 320 and 322 may be implemented using a microprocessor and associated memory (such as an MC68HC11 microprocessor available from Motorola, Inc.) or part of a custom digital signal processor to perform the process shown in FIGS. 5A and 5B.

The signal output from correlator 313, $C_I(t)$ is represented in FIG. 4 and may be generally expressed as:

$$C_I(t,T) = \int_{-\infty}^{\infty} r(t)LPI(t - T)dT \qquad (8)$$

where r(t) is a synchronization sequence and Y is an incrementing sample period corresponding to each correlation cycle of correlator 315. When $r(t) = a_T(t)$, by design, and when $LPI'(t) = (\tfrac{1}{2})a_T(t-Y)\cos\gamma$, the signal output from correlator 313, $C_I(t)$, reaches a large positive or negative value when the incrementing sample period (Y) causes the predetermined local synchronization sequence $a_T(t)$ and the input signal LPI'(t) to align in correlation. At correlation, therefore:

$$\begin{aligned} C_I(t) &= (\tfrac{1}{2})\cos\gamma \int_0^{t_s} a_T(t)a_T(t - T)dT \\ &= (\tfrac{1}{2})\cos\gamma \int_0^{t_s} [a_T(t)]^2 dt \\ &= (\tfrac{1}{2})J\cos\gamma \end{aligned} \qquad (9)$$

where J is the peak autocorrelation value.

Likewise, the signal output from correlator 315, $C_Q(t)$, is represented in FIG. 4 and may be generally expressed as:

$$C_Q(t,T) = \int_0^{t_s} r(t)LPQ(t - T)dt. \qquad (10)$$

When $LPQ'(t) = -(\tfrac{1}{2})a_T(t-Y)\sin\gamma$, the signal output from correlator 315, $C_Q(t)$, reaches a large positive or negative value when the incrementing sample period (Y) causes the predetermined local synchronization sequence $a_T(t)$ and the input signal LPQ'(t) to align in correlation. At correlation:

$$\begin{aligned} C_Q(t) &= (\tfrac{1}{2})\sin\gamma \int_0^{t_s} a_T(t)a_T(t - T)dt \\ &= (\tfrac{1}{2})\sin\gamma \int_0^{t_s} [a_T(t)]^2 dt \\ &= (\tfrac{1}{2})J\sin\gamma. \end{aligned} \qquad (11)$$

The correlation outputs $C_I(t)$ and $C_Q(t)$ at the increment of correlation cause the magnitude hold functions (320 and 322, respectively) to assume the magnitude and sign of the correlation outputs. Since the $C_I(t)$ and $C_Q(t)$ at correlation have achieved their maximum magnitude, this is the magnitude which is held for the remaining duration of the timeslot. The held outputs from magnitude hold functions 320 and 322 are then as shown in FIG. 4:

$$H_I(t) = (\tfrac{1}{2})J\cos\gamma \qquad (12)$$

and, $$H_Q(t) = -(\tfrac{1}{2})J\sin\gamma. \qquad (13)$$

The magnitude hold functions are subsequently reset after the timeslot by decision and timing function 318. In the preferred embodiment, decision and timing circuit 318 is realized using a custom digital signal processor, although a conventional microprocessor (such as an MC68020 microprocessor available from Motorola, Inc.) and associated memory and timing dividers may be employed. The decision and timing function 318 may cause the predetermined synchronization sequence to be coupled to correlators 313 and 315 prior to the desired timeslot to be demodulated. TDMA frame timing is determined by data signal recovery circuit 117 employing a conventional framing algorithm to confirm and maintain timeslot acquisition. Correlators 313 and 315 each correlate the stored acquisition sequence against the last 32 received A/D samples, and for each new sample perform another complete correlation.

For the remainder of the timeslot, signal $H_I(t)$ the held output of magnitude hold circuit 320, is input to multiplier 340 (which in the preferred embodiment is part of a custom digital signal processor but may be a conventional four-bit multiplier) where it is multiplied with the filtered data LPI(t) producing an output, K(t), defined by:

$$K(t) = [(\tfrac{1}{2})J\cos\gamma][(\tfrac{1}{2})a(t)\cos\gamma + (\tfrac{1}{2})b(t)\sin\gamma] \quad (14)$$
$$= (\tfrac{1}{4})Ja(t)\cos^2\gamma + (\tfrac{1}{4})Jb(t)\sin\gamma\cos\gamma.$$

Similarly, $H_I(t)$ is input to multiplier 344 (a similar four-bit by four-bit multiplier) where it is multiplied with the filtered data LPQ(t) producing an output, L(t), defined by:

$$L(t) = [(\tfrac{1}{2})J\cos\gamma][-(\tfrac{1}{2})a(t)\sin\gamma + (\tfrac{1}{2})b(t)\cos\gamma] \quad (15)$$
$$= (\tfrac{1}{4})Ja(t)\sin\gamma\cos\gamma + (\tfrac{1}{4})Jb(t)\cos^2\gamma.$$

The held output signal of magnitude hold function 322, $H_Q(t)$, is input to multiplier 348 where it is multiplied with LPI(t) to produce output M(t) of:

$$M(t) = [-(\tfrac{1}{2})J\sin\gamma][(\tfrac{1}{2})a(t)\cos\gamma + (\tfrac{1}{2})b(t)\sin\gamma] \quad (16)$$
$$= (\tfrac{1}{4})Ja(t)\cos\gamma\sin\gamma - (\tfrac{1}{4})Jb(t)\sin^2\gamma.$$

And $H_Q(t)$ is input to multiplier 352 where it is multiplied with LPQ(t) to produce output N(t):

$$N(t) = [-(\tfrac{1}{2})J\sin\gamma][-(\tfrac{1}{2})a(t)\sin + (\tfrac{1}{2})b(t)\cos\gamma] \quad (17)$$
$$= (\tfrac{1}{4})Ja(t)\sin^2\gamma - (\tfrac{1}{4})Jb(t)\sin\gamma\cos\gamma.$$

Outputs K(t) and N(t) are input into conventional parallel adder 360 which algebraically adds K(t)+N(t). The ($\sin\gamma \cos\gamma$) terms cancel and the squared terms add to unity. Thus, the output of adder 360 is:

$$(\tfrac{1}{4})Ja(c) = I \text{ channel data.} \quad (18)$$

Outputs L(t) and M(t) are input to conventional parallel adder 364 which algebraically combines L(t)M(t). The ($\sin\gamma \cos\gamma$) terms cancel and the squared terms add to unity. Thus the output of adder 364 is:

$$(\tfrac{1}{4})Jb(t) = Q \text{ channel data.} \quad (19)$$

So long as the held signals $H_I(t)$ and $H_Q(t)$ represent the necessary compensation for the radio channel phase shift, the I channel data and the Q channel data are recovered. In a TDMA system where the duration of the desired timeslot is short relative to the rate of change of the radio channel phase, the $H_I(t)$ and $H_Q(t)$ signals will accurately represent the necessary compensation during the timeslot time interval. It should be apparent that each timeslot gets a unique $H_I(t)$ and $H_Q(t)$ determined by the radio channel induced phase change in the acquisition signal transmitted at the beginning of each timeslot.

Additionally, if the bi-phase acquisition sequence is transmitted in a phase other than that of I (or Q), as long as its phase angle Z is known, it can be compensated. The outputs from Correlators 313 and 315 may be delayed copies of LPI(t) and LPQ(t), respectively, permitting a period of time between correlation occurrence and data presence at the multipliers for refined calculation of the compensating vectors $CH_I(t)$ and $CH_Q(t)$, given by:

$$CH_I(t) = (\tfrac{1}{2})J\cos(\gamma - Z)$$

$$CH_Q(t) = -(\tfrac{1}{2})J\sin(\gamma - Z).$$

Referring now to FIGS. 5A and 5B, a preferred implementation of the correlators 313 and 315; magnitude hold functions 320 and 322; decision and timing function 318; multipliers 340, 344, 348, and 352; and summers 360 and 364 is shown in flowchart form. Such implementation in the preferred embodiment is realized in the control program of a custom digital signal processor. The process is initialized at the end of the TDMA timeslot as conventionally detected by the data signal recovery circuit 117. Initialization primarily resets the magnitude hold 320 and 322 to zero and reloads correlators 313 and 315 with the local copy of the synchronization sequence $a_T(t)$.

Upon an interrupt, the process samples the outputs of A/D 309 and 311, at step 501. It must be noted that the analog to digital conversion and sampling of LPI(t) and LPQ(t) introduces a granularization of the time-varying signals limited by the numerical precision of the digital representation during a sample interval. When processing the signals in a digital signal processor (or other general processor) it is customary to represent the time domain signal as an i-th sample of the signal, where the sample has a particular precision. In the preferred embodiment, each sample is represented by an 8-bit byte and:

| | |
|---|---|
| LPI(t)≈LPI(i) | LPQ(t)≈LPQ(i) |
| $C_I(t) \approx C_I(i)$ | $C_Q(t) \approx C(i)$ |
| $H_I(t) \approx H_I(i)$ | $H_Q(t) \approx H(i)$ |
| K(t)≈K(i) | L(t)≈L(i) |
| M(t)≈M(i) | N(t)≈N(i) |
| $a_T(t) \approx \text{Ref}(i)$. | |

Figure 6:
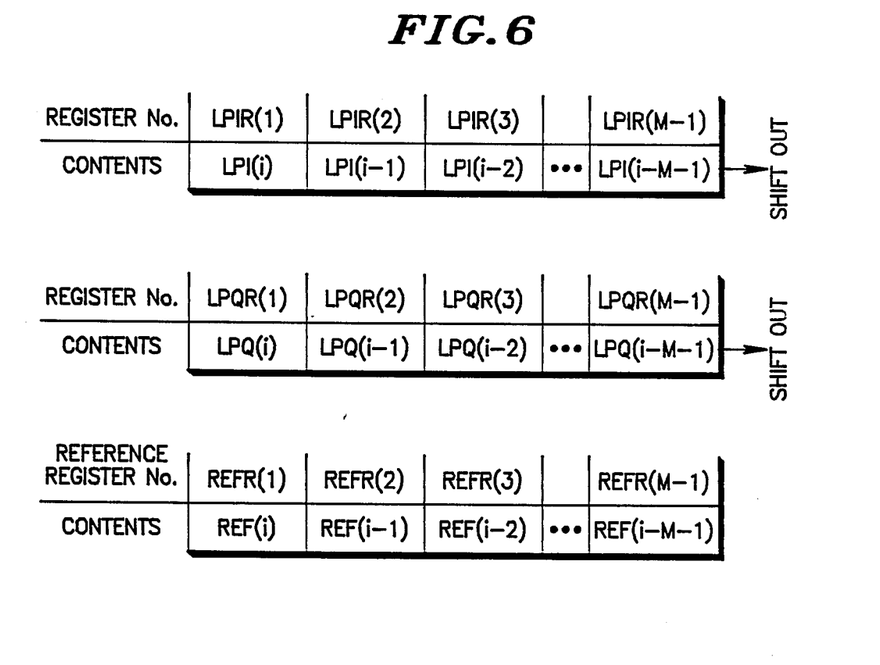
FIG. 6 is a register map employed in the correlation function of FIG. 5A.

Each sample LPI(i) and LPQ(i) are stored in 8-bit bytes in registers as shown in FIG. 6. As each new sample is taken, the oldest sample in the registers is shifted out and lost. Referring again to FIGS. 5A and 5B, the oldest samples are shifted out of each data register, at 503, each other sample is shifted one byte, at 505, and the newest sample of LPI(i) and LPQ(i) are shifted in, at 507. This is an effective change in Y. The correlator outputs $C_I(i)$ and $C_Q(i)$ are set to zero (at 509) before the correlation calculations are made, at 511. (The calculations made in a digital signal processor are equivalent to those made in a discrete correlator such as the IMS A100 cascadable signal processor). Each calculation of correlation is made by multiplying the contents of the j-th register with the contents of the corresponding j-th reference register and summing the products from j=1 to j=P. As described earlier, a peak output of $C_I(i)$ and $C_Q(i)$ occurs at correlation.

The magnitude hold process is realized by comparing the magnitude of $C_I(i)$ to the held magnitude $H_I(i)$, at 513, and equating $H_I(i)$ to the present i-th value of $C_I(i)$ (both magnitude and sign), at 515, if the test of step 513 is affirmative. A similar test for the magnitude of $C_Q(i)$ exceeding the magnitude of $H_Q(i)$ is made at 517 and the $H_Q(i)$ is made equal to the present i-th value of $C_Q(i)$, at 519, if $|C_Q(i)|$ is greater than $|H_Q(i)|$.

The I data and Q data is recovered without the phase error $\gamma$ from the algebraic calculations of step 521 (for I data) and step 523 (for Q data). The process then awaits the next interrupt.

In summary, then, the means for acquiring a rapid phase reference for QPSK and other multi-phase modulated signals in a radio system has been shown and described. An acquisition sequence is transmitted on one phase of the multi-phase signal and received by a receiver after being subjected to the undesirable random phase variation introduced by the radio channel. At the receiver, the received signal is separated into quadrature signals (or N-phase signals at appropriate phase angles) and applied to synchronization correlators which generate output signals related to the best correlation between the quadrature input signals and a predetermined replica of the synchronization sequence. The output signals are held for the duration of a TDMA timeslot and multiplied against the received signal and its quadrature to obtain the corrected I and Q channel data. Therefore, while a particular embodiment of the invention has been shown and described, it should be understood that the invention is not limited thereto since modifications unrelated to the true spirit and scope of the invention may be made by those skilled in the art. It is therefore contemplated to cover the present invention and any and all such modifications by the claims of the present invention.

We claim:

1. A digital radio receiver which demodulates a time division multiphase modulated data signal having a first portion of the multiphase modulated data signal reserved for a predetermined synchronizing signal and a second portion of the multiphase modulated data signal reserved for a message, the receiver comprising:

means, including a reference signal generator having fixed quadrature phases during demodulation of the data signal, for separating the multiphase modulated data signal into first and second intermediate data signals, each intermediate data signal comprising a predetermined synchronizing signal portion and a message portion;

means for detecting a predetermined synchronizing signal from said first and second intermediate data signals; and means, responsive to said means for detecting, for calculating a phase difference between an output of said reference signal generator and the multiphase modulated data signal, and removing said calculated phase difference from said first and second intermediate data signal message portions.

2. A digital radio receiver in accordance with claim 1 wherein said predetermined synchronizing signal is modulated on one vector of the time division multiphase modulated data signal.

3. A digital radio receiver in accordance with claim 1 wherein said means for detecting further comprises:

first means for correlating the predetermined synchronizing signal from said first intermediate data signal with a local predetermined synchronizing signal and for producing a first correlation output signal; and second means for correlating the predetermined synchronizing signal from said second intermediate data signal with said local predetermined synchronizing signal and for producing a second correlation output signal.

4. A digital radio receiver in accordance with claim 3 wherein said means for detecting further comprises means for holding the peak signed magnitude value of said first correlation output signal and producing a first held magnitude signal and for holding the peak signed magnitude value of said second correlation output signal and producing a second held magnitude signal.

5. A digital radio signal in accordance with claim 4 wherein said means for calculating a phase difference and removing said calculated phase difference further comprises:

first means for multiplying said first held magnitude signal by said first intermediate data signal;

second means for multiplying said second held magnitude signal by said second intermediate data signal;

means for summing an output from said first multiplying means with an output from said second multiplying means;

third means for multiplying said first held magnitude signal by said second intermediate data signal;

fourth means for multiplying said second held magnitude signal by said first intermediate data signal; and means for summing the difference of an output from said third means for multiplying and an output from said fourth means for multiplying.

6. A digital radio receiver which demodulates a time division multiphase modulated data signal having a first portion of the multiphase modulated data signal reserved for a predetermined synchronizing signal and a second portion of the multiphase modulated data signal reserved for a message, the receiver comprising:

means including a reference signal generator having fixed quadrature phases during demodulation of the data signal, for separating the multiphase modulated data signal into first and second intermediate data signals, each intermediate data signal comprising a predetermined synchronizing signal portion and a message portion; and means for processing said first and second intermediate data signals, said means for processing comprising means for detecting a predetermined synchronizing signal from said first and second intermediate signals, means for calculating a phase difference between an output of said reference signal generator and the multiphase modulated data signal, and means for removing said calculated phase difference from said first and second intermediate data signal message portions.

7. A digital radio receiver in accordance with claim 6 wherein said predetermined synchronizing signal is modulated on one vector of the time division multiphase modulated data signal.

8. A digital radio receiver in accordance with claim 6 wherein said means for detecting further comprises:

first means for correlating the predetermined synchronizing signal from said first intermediate data signal with a local predetermined synchronizing signal and for producing a first correlation output signal; and second means for correlating the predetermined synchronizing signal from said second intermediate data signal with said local predetermined synchronizing signal and for producing a second correlation output signal.

9. A digital radio receiver in accordance with claim 8 wherein said means for detecting further comprises means for holding the peak signed magnitude value of said first correlation output signal and producing a first held magnitude signal and for holding the peak signed magnitude value of said second correlation output signal and producing a second held magnitude signal.

10. A digital radio signal in accordance with claim 9 wherein said means for calculating a phase difference and said means for removing said calculated phase difference further comprises:
   first means for multiplying said first held magnitude signal by said first intermediate data signal;
   second means for multiplying said second held magnitude signal by said second intermediate data signal;
   means for summing an output from said first multiplying means with an output from said second multiplying means;
   third means for multiplying said first held magnitude signal by said second intermediate data signal;
   fourth means for multiplying said second held magnitude signal by said first intermediate data signal; and
   means for summing the difference of an output from said third means for multiplying and an output from said fourth means for multiplying.

11. A demodulator in a digital radio receiver which receives a (time division multiple access) TDMA quadrature phase shift keying (QPSK) modulated data signal timeslot, the QPSK modulated data signal timeslot having a first portion of the QPSK modulated data signal timeslot reserved for a predetermined synchronizing signal and a second portion of the QPSK modulated data signal timeslot reserved for a message, the receiver having a reference signal to separate the QPSK modulated data signal timeslot into quadrature first and second intermediate data signals, each intermediate data signal comprising a predetermined synchronizing signal portion and a message portion, the demodulator comprising:
   first means for correlating a predetermined synchronizing signal from said first intermediate data signal with a local predetermined synchronizing signal and for producing a first correlation output signal;
   second means for correlating a predetermined synchronizing signal from said second intermediate data signal with said local predetermined synchronizing signal and for producing a second correlation output signal;
   means for holding the peak magnitude value of said first correlation output signal for the duration of one TDMA timeslot and producing a first held magnitude signal;
   means for holding the peak magnitude value of said second correlation output signal for the duration of one TDMA timeslot and producing a second held magnitude signal;
   first means for multiplying said first held magnitude signal by said first intermediate data signal;
   second means for multiplying said second held magnitude signal by said second intermediate data signal;
   means for summing an output from said first multiplying means with an output from said second multiplying means;
   third means for multiplying said first held magnitude signal by said second intermediate data signal;
   fourth means for multiplying said second held magnitude signal by said first intermediate data signal; and
   means for summing the difference of an output from said third means for multiplying and an output from said fourth means for multiplying.

12. A method of demodulation in a digital radio receiver receiving a time division multiphase modulated data signal having a first portion of the multiphase modulated data signal reserved for a predetermined synchronizing signal and a second portion of the multiphase modulated data signal reserved for a message, the method comprising the steps of:
   separating the multiphase modulated data signal into first and second intermediate data signals with a reference signal having fixed quadrature phases during demodulation of the data signal, each intermediate data signal comprising a predetermined synchronizing signal portion and a message portion;
   detecting a predetermined synchronizing signal from said first and second intermediate data signals;
   calculating, in response to said detection of said predetermined synchronizing signal, a phase difference between said reference signal and the multiphase modulated data signal; and
   removing said calculated phase difference from said first and second intermediate data signal message portions.

13. A method in accordance with the method of claim 12 wherein said detecting step further comprises the steps of:
   correlating the predetermined synchronizing signal from said first intermediate data signal with a local predetermined synchronizing signal and producing a first correlation output signal; and
   correlating the predetermined synchronizing signal from said second intermediate data signal with said local predetermined synchronizing signal and producing a second correlation output signal.

14. A method in accordance with the method of claim 13 wherein said detecting step further comprises the steps of holding the peak magnitude value of said first correlation output signal and producing a first held magnitude signal and holding the peak magnitude value of said second correlation output signal and producing a second held magnitude signal.

15. A method in accordance with the method of claim 14 wherein said steps of calculating a phase difference and removing said calculated phase difference further comprise the steps of:
   multiplying said first held magnitude signal by said first intermediate data signal;
   multiplying said second held magnitude signal by said second intermediate data signal;
   summing the product of said first held magnitude signal and said first intermediate data signal with the product of said second held magnitude signal and said second intermediate signal;

multiplying said first held magnitude signal by said second intermediate data signal;

multiplying said second held magnitude signal by said first intermediate data signal; and summing the difference of the product of said first held magnitude signal and said second intermediate data signal with the product of said second held magnitude signal and said first intermediate data signal.

16. A method of demodulation in a digital radio receiver which receives a time division multiple access TDMA quadrature phase shift keying (QPSK) modulated data signal timeslot, the QPSK modulated data signal timeslot having a first portion of the QPSK modulated data signal timeslot reserved for a predetermined synchronizing signal and a second portion of the QPSK modulated data signal timeslot reserved for a message, the receiver having a reference signal to separate the QPSK modulated data signal timeslot into quadrature first and second intermediate data signals, each intermediate data signal comprising a predetermined synchronizing signal portion and a message portion, the method of demodulation comprising the steps of:

correlating a predetermined synchronizing signal from said first intermediate data signal with a local predetermined synchronizing signal and producing a first correlation output signal;

correlating a predetermined synchronizing signal from said second intermediate data signal with said local predetermined synchronizing signal and producing a second correlation output signal;

holding the peak magnitude value of said first correlation output signal for the duration of one TDMA timeslot and producing a first held magnitude signal;

holding the peak magnitude value of said second correlation output signal for the duration of one TDMA timeslot and producing a second held magnitude signal;

multiplying said first held magnitude signal by said first intermediate data signal;

multiplying said second held magnitude signal by said second intermediate data signal;

summing the product of said first held magnitude signal and said first intermediate data signal with the product of said second held magnitude signal and said second intermediate data signal;

multiplying said first held magnitude signal by said second intermediate data signal;

multiplying said second held magnitude signal by said first intermediate data signal; and summing the difference of the product of said first held magnitude signal and said second intermediate data signal with the product of said second held magnitude signal and said first intermediate data signal.

* * * * *